(12) United States Patent
Kano et al.

(10) Patent No.: US 8,407,618 B2
(45) Date of Patent: Mar. 26, 2013

(54) DISPLAYING AN OPERATION KEY IMAGE TO DISTINGUISH A CORRESPONDENCE BETWEEN AN OPERATION KEY AND A SELECTED WINDOW

(75) Inventors: Izua Kano, Tokyo (JP); Kazuhiro Yamada, Tokyo (JP); Dai Kamiya, Tokyo (JP); Yasushi Onda, Tokyo (JP); Keiichi Murakami, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 218 days.

(21) Appl. No.: 12/810,090

(22) PCT Filed: Dec. 5, 2008

(86) PCT No.: PCT/JP2008/072184
§ 371 (c)(1),
(2), (4) Date: Jun. 22, 2010

(87) PCT Pub. No.: WO2009/087842
PCT Pub. Date: Jul. 16, 2009

(65) Prior Publication Data
US 2010/0275157 A1    Oct. 28, 2010

(30) Foreign Application Priority Data
Jan. 7, 2008 (JP) ................................. 2008-000760

(51) Int. Cl.
*G06F 3/048* (2006.01)
(52) U.S. Cl. ......................... 715/803; 715/821; 715/808
(58) Field of Classification Search .......................... None
See application file for complete search history.

(56) References Cited

U.S. PATENT DOCUMENTS

2007/0204237 A1* 8/2007 Guo et al. ..................... 715/822
2010/0262493 A1* 10/2010 Tahkokallio et al. ...... 705/14.53

FOREIGN PATENT DOCUMENTS

| CN | 101091150 A | 12/2007 |
|---|---|---|
| GB | 2350991 A | 12/2000 |
| JP | 09-120352 | 5/1997 |
| JP | 09-153042 | 6/1997 |
| JP | 09-153042 A | 6/1997 |
| JP | 10-269268 A | 9/1998 |
| JP | 10-269268 | 10/1998 |
| JP | 10-334092 | 12/1998 |
| JP | 2003-186593 | 7/2003 |
| JP | 2003-186593 A | 7/2003 |
| WO | 2006070228 A2 | 7/2006 |

OTHER PUBLICATIONS

Japanese Office Action for JP Application Serial No. 2008-000760 dated Apr. 28, 2010.
2nd Notification of Office Action issued in Chinese Patent Application No. 200880124271.0 issued on Oct. 10, 2012.

* cited by examiner

*Primary Examiner* — Stephen Hong
*Assistant Examiner* — Asher Kells
(74) *Attorney, Agent, or Firm* — MKG, LLC

(57) ABSTRACT

To enable a user to distinguish readily a correspondence between an operation key and a window to which the operation is assigned. An information-processing device according to the present invention, on obtaining an operation signal of a particular operation key (specifying key) (S1), determines whether a focused (or selected) window exists (S2). If such a window does not exist, the information-processing device displays a window of a particular application and a soft key image corresponding to a soft key so that they are located close to each other, and focuses the window of the particular application (S6 and S7).

8 Claims, 4 Drawing Sheets

DISPLAYING AN OPERATION KEY IMAGE TO DISTINGUISH A CORRESPONDENCE BETWEEN AN OPERATION KEY AND A SELECTED WINDOW

TECHNICAL FIELD

The present invention relates to display control carried out when a window is selected.

BACKGROUND

A technique for assigning plural functions to a single key (operation key) is known. The technique is commonly used in an information-processing device such as a mobile phone, in which a number of keys is limited. A key to which the technique is applied is referred to as a "soft key" (software key), since functions are assigned to the key for each piece of software.

When plural functions are assigned to a single key, functions assigned to the key can be displayed. If functions are displayed, a user can distinguish readily functions assigned to the key.

SUMMARY

However, in an environment where plural pieces of application software (hereinafter simply referred to as "application") can be executed, and functions assigned to a key are displayed, it can be difficult to distinguish to which applications the displayed functions correspond. For example, in a case where plural applications exist, that perform processing using a displayed window, and plural windows are simultaneously displayed, it can be difficult to distinguish to which of the windows a displayed function corresponds.

In view of this, the present invention has an object of enabling a user to distinguish readily a correspondence between an operation key and a window to which the operation key is assigned.

An information-processing device according to the present invention comprises: an obtaining means for obtaining an operation signal indicating an operation key that has been selected; a display control means for displaying a window corresponding to a program, and an operation key image representing an operation key, in a predetermined position of a display area; and an execution means for carrying out processing on the basis of an operation signal obtained by the obtaining means, wherein the execution means, if the window has not been selected, causes the display control means to display the window and the operation key image so that the window and the operation key image are located close to each other, and carries out processing for selecting the window.

In the information-processing device according to the present invention, the obtaining means may obtain an operation signal indicating the operation key represented by the operation key image, and the execution means, if the window has been selected, may carry out processing on the basis of the obtained operation signal, in accordance with a procedure described in the program.

In the information-processing device according to the present invention, the display control means, when the window is selected by the execution means, may change a displayed state of the operation key image, when displaying the operation key image.

In the information-processing device according to the present invention, there may be provided an operation means comprising the operation key represented by the operation key image, for generating an operation signal corresponding to an operation key that has been selected, and a color indicating means for indicating a color in an area corresponding to the operation key, and the display control means may change a color of the operation key image, when displaying the operation key image, and the color display means may change a display color of the area corresponding to the operation key represented by the operation key image, in response to the change of a color of the operation key image.

In the information-processing device according to the present invention, the display control means, when the window is selected by the execution means, and an image exists, that is displayed on top of the window, may display the window on top of the image.

In the information-processing device according to the present invention, the display control means, when the window is selected by the execution means, may enlarge the window, when displaying the window.

In the information-processing device according to the present invention, the display control means, when the window is selected by the execution means, may display the operation key image so that the operation key image is located close to the window, and display an alternative image in an original display position of the operation key image.

In the information-processing device according to the present invention, the display control means, when the window is selected by the execution means, may change a color of an area of the display area, that is different from an area in which the window and the operation key image are displayed.

A program according to the present invention causes a computer to execute the steps of: obtaining an operation signal indicating an operation key that has been selected; displaying a window corresponding to a program, and an operation key image representing an operation key, in a predetermined position of a display area; carrying out processing on the basis of the obtained operation signal, the step of carrying out processing comprising: if the window has not been selected, displaying the window and the operation key image so that the window and the operation key image are located close to each other; and carrying out processing for selecting the window.

The present invention enables a user to distinguish readily a correspondence between an operation key and a window to which the operation key is assigned.

DETAILED DESCRIPTION

An Embodiment of the present invention will now be described with reference to the drawings.

[Embodiment]

Figure 1:
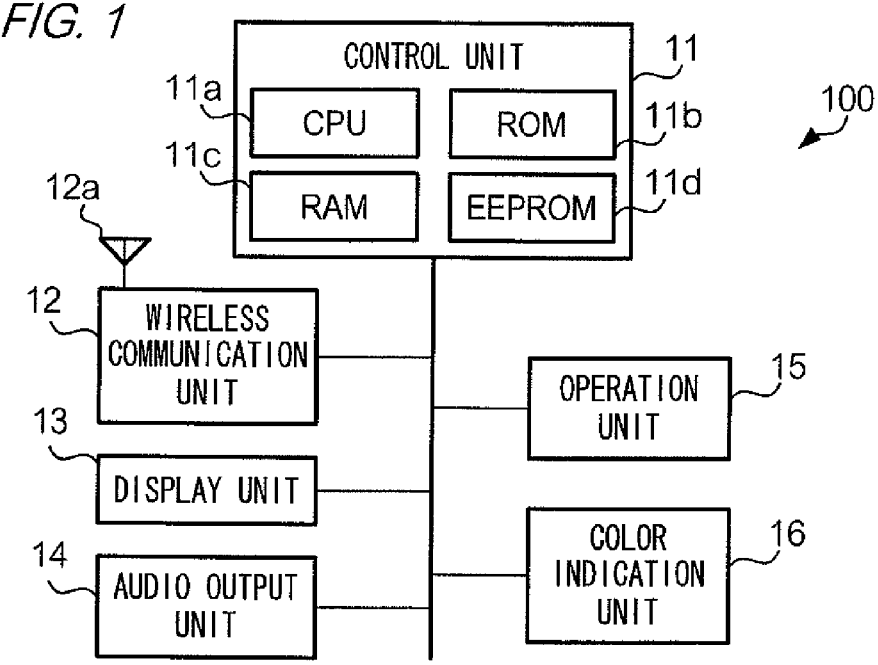
FIG. 1 is a block diagram showing a configuration of an information-processing device according to the present invention.

FIG. 1 is a block diagram illustrating a configuration of information-processing device 100 according to an embodiment of the present invention. As shown in the drawing, information-processing device 100 comprises control unit 11, wireless communication unit 12, display unit 13, audio output unit 14, operation unit 15, and color indication unit 16. It is assumed that information-processing unit 100 is a mobile phone.

Control unit 11 comprises CPU (Central Processing Unit) 11a, ROM (Read Only Memory) 11b, RAM (Random Access Memory) 11c, and EEPROM (Electronically Erasable and Programmable ROM) 11d. CPU 11a executes a program stored in ROM 11b or EEPROM 11d while using RAM 11c as a work area, to control components of information-processing device 100. Wireless communication unit 12 comprises antenna 12a, and performs data communication wirelessly with a predetermined mobile communication network. Display unit 13 comprises a liquid crystal display and a driving circuit, and displays an image in a predetermined display area on a basis of image data provided from control unit 11. Audio output unit 14 comprises a speaker, and outputs a voice corresponding to voice data provided from control unit 11.

Operation unit 15 comprises plural keys (Operation keys), and provides an operation signal to control unit 11, that corresponds to an operation by a user. Color indication unit 16 comprises display elements that correspond to respective keys of operation unit 15. The display elements emit light so that keys can be indicated by colors. In the display elements a color indicated by the display element can be changed. For example, the display elements comprise red, green, and blue light-emitting diodes, an amount of light of which can be adjusted so that an indicated color can be changed.

Figure 2:
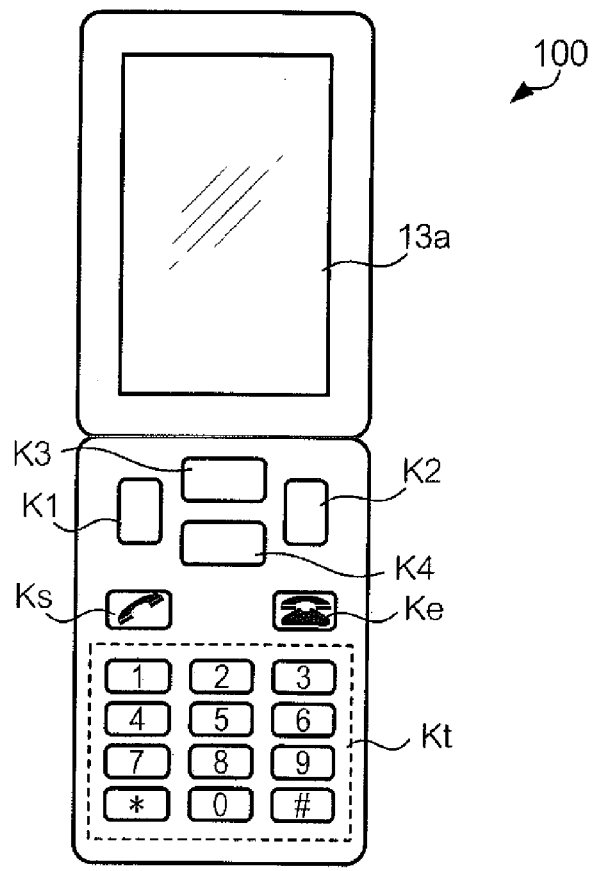
FIG. 2 is a diagram showing an appearance of an information-processing device.

FIG. 2 is a diagram showing an appearance of information-processing device 100. FIG. 2 especially shows a display area of display unit 13 and keys of operation unit 15. As shown in the drawing, information-processing unit 100 comprises display area 13a and plural keys. Display area 13a comprises pixels of plural rows and plural columns that realize color display. Each of the pixels has a gradation according to display data so that various images can be displayed. The keys of operation unit 15 comprises numeric keys (Kt), call key (Ks), call end key (Ke), and soft keys (K1 to K4). The numeric keys are used for inputting characters or numbers. The call key and the call end key are used for ordering a start or end of a call. The call end key is also used for closing a running application. The soft keys have functions that are assigned depending on OS 111 or an application. The soft keys are provided in the lower part of display area 13a. The soft keys are located closer to display area 13a than the numeric keys, the call key, and the call end key. Functions assigned to the soft keys will be described later.

Each key of operation unit 15 at least partially comprises a transparent area that transmits light emitted from inside. A display element of color indication unit 16 emits light from the inside of each key so that a color specified to the key is displayed. For example, if a display element corresponding to a key glows red, the key appears red to a user.

ROM 11b pre-stores programs. The programs will hereinafter be referred to as "preinstalled programs." Specifically, the preinstalled programs are a multitasking operating system (hereinafter referred to as "multitasking OS"), a Java (Registered Trademark) platform, and native applications. The multitasking OS is an operating system that supports functions such as allocation of virtual memory spaces, which are necessary to realize a pseudo-parallel execution of plural tasks using a TSS (Time-Sharing System). The Java platform is a collection of programs that are described in accordance with a CDC (Connected Device Configuration), which is a configuration for providing Java execution environment 113 (described later) in information-processing device 100 having a multitasking OS. Native applications are programs for providing information-processing device 100 with basic functions such as voice communication.

EEPROM 11d comprises a Java application storage area for storing Java applications. A Java application consists of: a JAR (Java Archive) file including a main program, which is a sequence of instructions executed under a Java execution environment, and image files and audio files used when the main program is running; and an ADF (Application Descriptor File) in which information on installation and execution of the main program and attribute information of the main program are described. A Java application is created by a content provider or a carrier, and stored in a server. The Java application is downloaded from the server in response to a request from information-processing device 100.

Figure 3:
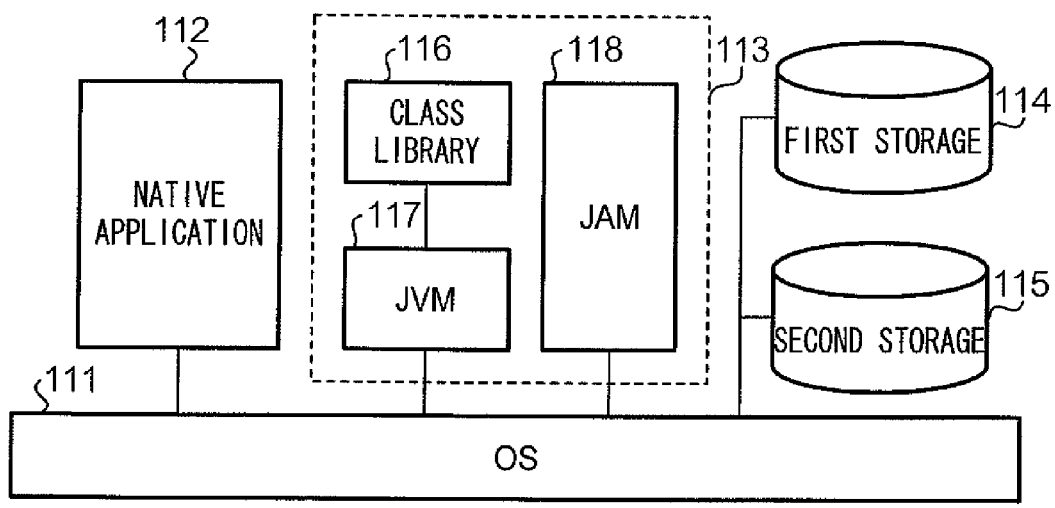
FIG. 3 is a diagram showing a logical configuration of an information-processing device.

FIG. 3 is a diagram illustrating a logical configuration of units provided in control unit 11 of information-processing device 100 through execution of programs stored in ROM 11b and EEPROM 11d. As shown in the drawing, in information-processing device 100 that is running programs, native application 112 and Java execution environment 113 are provided in OS 111. Also, first storage 114 and second storage 115 are secured in EEPROM 11d.

Java execution environment 113 is provided through execution of Java platform stored in ROM 11b. Java execution environment 113 comprises class library 116, JVM (Java Virtual Machine) 117, and JAM (Java Application Manager) 118. Class library 116 is a collection of program modules (classes), each of which provides a particular function. JVM 117 is a Java execution environment optimized for the CDC described above, and has a function of interpreting and executing bytecode provided as a Java application. JAM 118 has a function of managing download, installation, execution, or termination of a Java application.

First storage 114 is an area for storing Java applications (JAR files and ADFs) downloaded under control of JAM 118. Second storage 115 is an area for storing data that is generated during execution of a Java application, after the program is terminated. A storage area of second storage 115 is assigned to each of the installed Java applications. Data of a storage area assigned to a Java application program can be rewritten during execution of the Java application, and cannot be rewritten during execution of another Java application.

Information-processing device 100 stores a "music player" as a Java application. The music player is an application that controls reproduction of a piece of music. The music player is also an application that downloads music data compressed in a prescribed format via wireless communication unit 12, and applies processing such as extension processing to the music data so that the music data is converted into data that audio output unit 14 is able to output. A function provided by the music player includes, in addition to the function of controlling reproduction of a piece of music, a function of displaying attribute information (a song title, a name of a singer, etc.) of a piece of music included in music data, or progress of reproduction of a piece of music. Procedures of the functions are described in a main program corresponding to the music player.

The foregoing is a description of a configuration of information-processing device 100. Information-processing device 100 having the above-mentioned configuration executes plural applications in accordance with a request from a user. A user performs operations using operation unit 15 to request information-processing device 100 to execute an application.

Information-processing device 100, when executing plural applications, displays plural windows corresponding to the applications (programs). Each application provides a particular function via a window corresponding to the application. For example, a music player provides a function of reproducing a piece of music, and provides a function of displaying information on a piece of music in a window, and controlling a start or suspension of reproduction of a piece of music.

Information-processing device 100 displays windows by using an overlap window method. Specifically, information-processing device 100 is able to move a window, or display plural windows so that they overlap each other. To that end, control unit 11 of information-processing device 100 stores data describing display positions of windows (hereinafter referred to as "window data"), and each time a window is moved, updates the window data. It is to be noted that when a window is hidden, and thereafter caused to reappear, the window is displayed in a position in which the window appeared last. For example, when a window that has been closed by a user is caused to reappear, information-processing device 100 displays the window in a display position in which the window last appeared. Also, information-processing device 100, if overlapping windows exist, displays on top a window that has been focused (or selected) most recently. In the following description, a focused window will be referred to as "active."

If an active window is subject to an operation, and the call end key is pressed, the window is closed, and a corresponding application is closed.

In the present embodiment, when a window is in a selected state, an application corresponding to the window is in a state in which the application is receptive to an input. Accordingly, when a window is in a selected state, and an input is provided by a user, control unit 11 carries out processing in accordance with an application corresponding to the window (namely, a procedure described in a program for realizing an application that provides a function using the window). An operation carried out when a user selects a soft key varies depending on a window selected at that time.

In a state where no window is selected (hereinafter referred to as "initial state"), control unit 11 provides an input from a user to OS 111.

Figure 4:
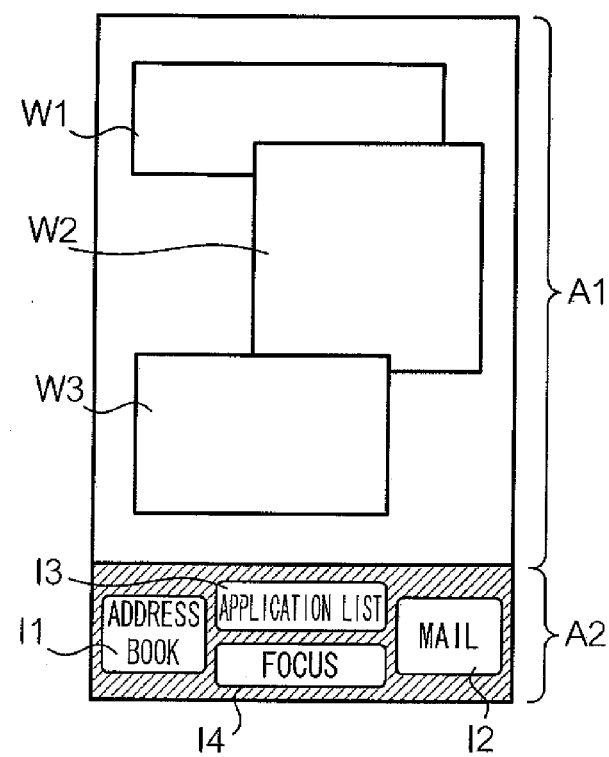
FIG. 4 is a diagram showing an example of an image displayed by a display unit.

FIG. 4 is a diagram showing an example of an image displayed by display unit 13. The image is an example of an image that is displayed when a display status is in an initial state. As shown in the drawing, the image displayed by display unit 13 comprises area A1 and area A2. Of the areas, area A1 is an area in which windows (W1 to W3) are displayed. Area A2 is located below area A1, which is an area in which images corresponding to soft keys (hereinafter referred to as "key images") are displayed in an initial state.

Key images are images that represent a shape of a corresponding key, and are arranged in the same manner as that in which the actual keys are arranged. For example, key image I1 corresponding to key K1 is displayed to the left side of key image I3 corresponding to key K3 and key image I4 corresponding to key K4. Key image I3 corresponding to key K3 is displayed above key image I4 corresponding to key K4.

Key images include characters or a sign that represent a function that has been assigned to the key image. The example shown in FIG. 4 shows functions assigned in an initial state, and specifically shows that a function of displaying an address book is assigned to key K1, a function of starting creation of an email is assigned to key K2, a function of displaying a list of Java applications is assigned to key K3. A user, by viewing and comparing the key images and the soft keys, is able to distinguish functions assigned to the soft keys (K1 to K4). The functions described above are provided by OS 111.

Also, in the example shown in FIG. 4, a function of, if no window has been focused, focusing a window of a predetermined particular window (hereinafter referred to as "particular application") is assigned to key K4. Key K4 having the function assigned will be hereinafter referred to as "specifying key." The "particular application" is an application that can be arbitrarily pre-selected by a user. The particular application may be associated with an application that a user frequently uses. In the present embodiment, it is assumed that a "music player" is assigned as the particular application.

Information-processing device 100 according to the present embodiment is characterized by an operation performed when a specifying key is selected. The operation performed by information-processing device 100 when a specifying key is selected will be described below.

Figure 5:
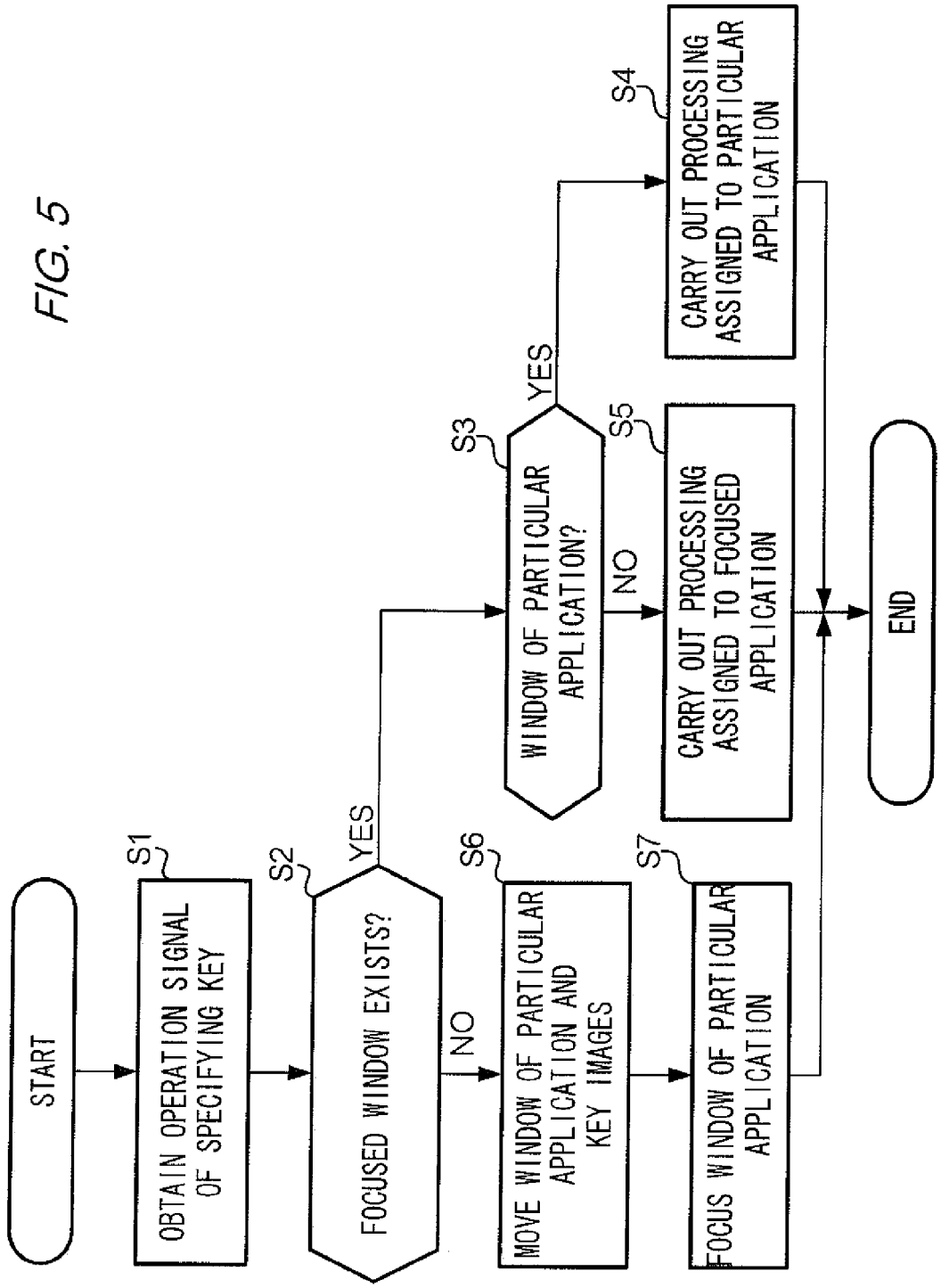
FIG. 5 is a flowchart showing an operation of an information-processing device.

FIG. 5 is a flowchart showing an operation of information-processing device 100, performed when a specifying key is selected by a user. The operation is carried out in response to selection of a specifying key by a user. As shown in the drawing, control unit 11 of information-processing device 100 initially obtains an operation signal from operation unit 15 that indicates selection of a specifying key (step S1). After obtaining the operation signal, control unit 11 determines whether a focused window exists (step S2).

If a focused window exists (step S2: YES), control unit 11 determines whether the focused window is a window of a particular application (step S3). If the focused window is a window of a particular application (step S3: YES), control unit 11 provides an input represented by the obtained operation signal to the particular application. Namely, control unit 11 carries out processing assigned to the specifying key in the particular application (step S4). On the other hand, if the focused window is not a window of a particular application (step S3: NO), control unit 11 provides an input represented by the obtained operation signal to an application that provides a function using the focused window (step S5).

If a focused window does not exist (step S2: NO), control unit 11 provides an input represented by the obtained operation signal to OS 111. Namely, control unit 11 carries out processing assigned to the specifying key in OS 111. Specifically, control unit 11 carries out processing of steps S6 and S7.

At step S6, control unit 11 displays a window of a particular application and key images in the center of display area 13a. Specifically, control unit 11 identifies display positions of windows by referring to window data, and changes a display position of a window of a particular application to the center of display area 13a. Subsequently, control unit 11 changes display positions of key images so that the images contact the lower edge of the window of a particular application. Control unit 11 generates display data for displaying windows and key images in the identified or changed display positions.

When display data is generated, and an image (e.g., another window) exists that overlaps the window of a particular application or the key images, control unit 11 may display the window of a particular application on top of the image. Also, if the particular application has not been started when the processing of step S6 is carried out, control unit 11 may start the particular application and display the window in the center of display area 13a. In this case, control unit 11 displays the window of the particular application without referring to content described in window data.

Subsequently, at step S7, control unit 11 focuses the window of a particular application. Specifically, control unit 11 changes a destination of an operation signal that will be obtained thereafter from OS 111 to the particular application. Also, control unit 11 causes display elements of color indication unit 16 that correspond to soft keys to emit light so that keys corresponding to the displayed key images are distinguished from other keys.

The foregoing is an operation of information-processing device 100. Now, the operation of information-processing device 100 will be described by citing concrete examples.

Figure 6:
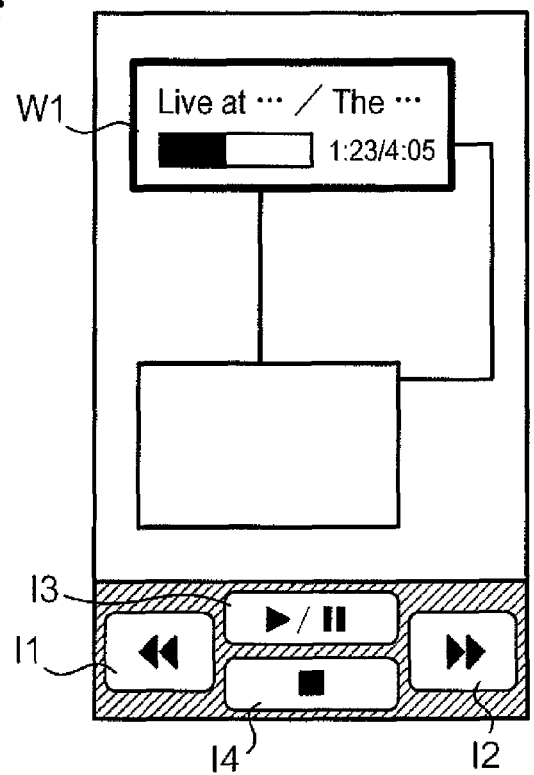
FIG. 6 is a diagram showing an example of an image displayed by a display unit.

First, a case will be described in which a window of a particular application (namely, a music player) is focused. In this case, it is assumed that an image displayed by display unit 13 is as shown in FIG. 6. It is also assumed that in the drawing window W1 of the music player is active. It is also assumed that when window W1 of the music player is active, functions assigned to soft keys (K1 to K4) are fast-rewinding (K1), fast-forwarding (K2), playing or pausing (K3), and stopping (K4), respectively.

When the image of FIG. 6 is shown, and a specifying key (namely, K4) is selected, control unit 11 processes an operation signal indicating the selection of key K4 as an input provided to the music player. Namely, control unit 11 carries out processing assigned to key K4 in the music player; namely, suspension of reproduction of a piece of music.

Second, a case will be described in which no window that is currently displayed is focused. In this case, it is assumed that an image displayed by display unit 13 is as shown in FIG. 4. It is also assumed that in the drawing, a window of a music player is window W1.

Figure 7:
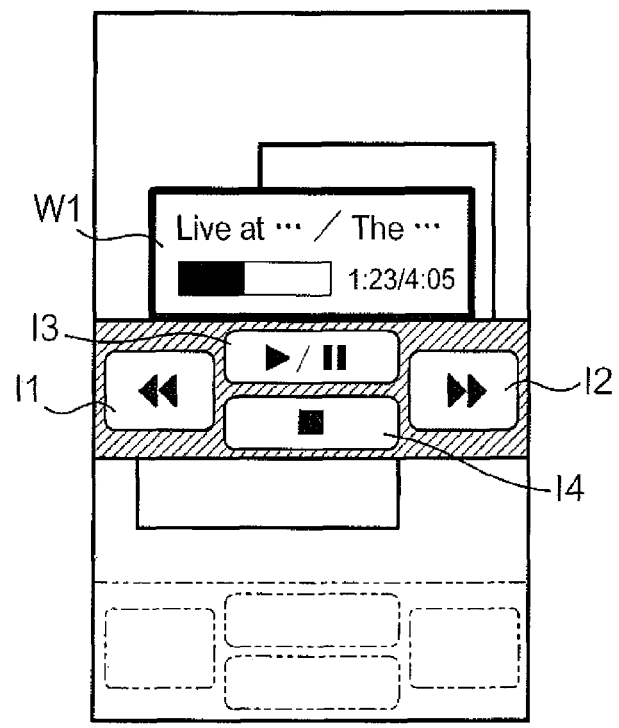
FIG. 7 is a diagram showing an example of an image displayed by a display unit.

When the image of FIG. 4 is shown, and a specifying key (namely, K4) is selected, control unit 11 processes an operation signal indicating the selection of key K4, as an input provided to OS 111. Namely, control unit 11 changes displayed content so that window W1 of the music player and key images I1 to I4 are located close to each other. Also, control unit 11 carries out processing for focusing the window of the music player. As a result, the image displayed by display unit 13 changes to an image shown in FIG. 7.

As described in the foregoing, information-processing device 100 according to the present embodiment, if a focused (or selected) window does not exist, and a specifying key is selected, displays a window of a predetermined particular window and key images in the center of display area 13*a*. As a result, a user of information-processing device 100 is able to distinguish readily a focused window and functions assigned to soft keys. Namely, according to information-processing device 100 according to the present embodiment, a user is able to distinguish readily a correspondence between soft keys and a window to which the soft keys are assigned.

The present invention may be implemented in an embodiment, which is different from the above embodiment. For example, the present invention may be implemented in embodiments described below. It is to be noted that the following modifications may be combined with each other.

A display position of a window of a particular application and display positions of key images may be changed in a manner different from that of the above embodiment. For example, display positions of key images may remain unchanged, and only a display position of a window of a particular application may be changed so that the window is located close to the key images. Alternatively, a display position of a window of a particular application may remain unchanged and only display positions of key images may be changed so that the key images are located close to the window of a particular application. Namely, it is not necessary to display a window of a particular application and key images in the center of display area 13*a*. Alternatively, images shown in animation that gradually approach each other may be displayed. In essence, in the present invention, a window and key images may be moved in any manner as long as at least one of them is moved closer to the other relative to a prescribed position of the one so that correspondence between the window of a particular application and the key images is clarified. A "prescribed position" for a window is, for example, a display position described as window data. A "prescribed position" for key images is, for example, a display position of an initial state (namely, area A2 of FIG. 4).

When a window of a particular application and key images are moved so that they are located close to each other, the window or the key images may be enlarged and displayed.

Alternatively, when a window of a particular application and key images are moved so that they are located close to each other, it may be determined whether the particular application is running, and if the particular application is running, display positions of the window and the key images may be changed. On the other hand, if the particular application is not running, display positions of the window and the key images may remain unchanged.

When a window of a particular application and key images are moved so that they are located close to each other, a displayed state of an area other than the window and the key images may be changed. For example, brightness or saturation of pixels of an area other than the window and the key images may be reduced so that the window and the key images stand out. Alternatively, image processing such as smoothing may be carried out to pixels of an area other than the window and the key images so that the area is obscured.

When a window of a particular application and key images are moved so that they are located close to each other, a displayed state of the key images may be changed. For example, colors of the key images may be changed when their display positions are changed. Alternatively, when display positions of the key images are changed, an alternative image for the key images may be displayed in the original display positions of the key images (namely, area A2 of FIG. 4). The alternative image is preferably displayed so that it does not appear more prominent than the key images.

In the above embodiment, when a window of a particular application and key images are moved so that they are located close to each other, characters or a sign shown in each key image is changed. However, it is not necessary to make such a change. For example, key images may be solid color images that represent a shape of a key.

It is not necessary for a specifying key to be a key displayed in display area 13*a* as a key image. For example, in the above embodiment, only images corresponding to keys K1, K2, and K3 may be displayed in display area 13*a* as key images.

A function similar to that of a specifying key may be assigned to one of the numeric keys. If the function is assigned to a numeric key, the key may function as a specifying key when the key is pressed for an extended period (in a case that the key has been selected for a given time). Further, when a key of "1" is pressed for an extended period, a window of a first application may be selected, and when a key of "2" is pressed for an extended period, a second application that is different from the first application may be selected.

Color indication unit 16 may indicate a color in an area around the key, instead of indicating a color inside a key. Display elements of color indication unit 16 may be liquid crystal display elements or organic EL (Electro Luminescence) elements. Operation unit 15 and color indication unit 16 may be combined so as to form a so-called touch screen (or touch panel).

Color indication unit 16 may change colors of soft keys when display positions of a window of a particular application and key images are changed so that they are Iodated close to each other. The colors of soft keys may correspond to the colors of key images displayed on display unit 13. For example, in a case where a color of a key image changes from red to blue when a window of a particular application and a key image are moved so that they are located close to each other, a color of a soft key may change from red to blue.

When plural key images are displayed, they may be displayed in different colors, and color indication unit 16 may indicate a corresponding color for a corresponding soft key. For example, when a key image corresponding to key K1 is displayed in red, and a key image corresponding to key K2 is displayed in green, color indication unit 16 may indicate red for key K1, and indicate green for key K2.

It is to be noted that color indication unit 16 is not an essential component. Keys do not need to be indicated by a color.

In the above embodiment, the present invention is applied to a mobile phone. However, the present invention may be applied to other information-processing devices. The present invention may be applied to various information-processing devices that display windows, such as a communication terminal including a PDA (Personal Digital Assistance), or a personal computer.

In the above embodiment, the present invention is described as a function of an OS. However, the present invention may be embodied as an independent application. Alternatively, a function of the present invention may be added as a plug-in to existing software such as an OS or an existing application. If the present invention is embodied as an application or a plug-in, the present invention may be provided as a program for causing a computer (information-processing device) to provide the functions described above. The program may be provided in a form of a recording medium such as an optical disk, or provided from a server through a network such as the Internet.

What is claimed is:

1. An information-processing device comprising:
   an obtaining means for obtaining an operation signal indicating an operation key that has been selected;
   a display control means for displaying a window corresponding to a program, and an operation key image representing an operation key, in a predetermined position of a display area; and
   an execution means for carrying out processing on the basis of an operation signal obtained by the obtaining means, wherein the execution means carries out processing for selecting the window,
   wherein if the window has been selected, the operation key image is moved to a location which is adjacent to the window,
   wherein the operation key image is changed to an image representative of a controllable function of a program corresponding to the selected window, and
   wherein the operation key controls at least one function of the program corresponding to the selected window.

2. An information-processing device according to claim 1, wherein:
   the obtaining means obtains an operation signal indicating the operation key represented by the operation key image; and
   the execution means, if the window has been selected, carries out processing on the basis of the obtained operation signal, in accordance with a procedure described in the program.

3. An information-processing device according to claim 1, wherein the display control means, when the window is selected by the execution means, changes a displayed state of the operation key image, when displaying the operation key image.

4. An information-processing device according to claim 1, further comprising:
   an operation means comprising the operation key represented by the operation key image, for generating an operation signal corresponding to an operation key that has been selected; and
   a color indicating means for indicating a color in an area corresponding to the operation key, wherein:
   the display control means changes a color of the operation key image, when displaying the operation key image; and
   the color display means changes a display color of the area corresponding to the operation key represented by the operation key image, in response to the change of a color of the operation key image.

5. An information-processing device according to claim 1, wherein the display control means, when the window is selected by the execution means and an image exists that is displayed on top of the window, displays the window on top of the image.

6. An information-processing device according to claim 1, wherein the display control means, when the window is selected by the execution means, enlarges the window when displaying the window.

7. An information-processing device according to claim 1, wherein the display control means, when the window is selected by the execution means, changes a color of an area of the display area that is different from an area in which the window and the operation key image are displayed.

8. A program for causing a computer to execute the steps of:
   obtaining an operation signal indicating an operation key that has been selected;
   displaying a window corresponding to a program, and an operation key image representing an operation key, in a predetermined position of a display area;
   carrying out processing for selecting the window,
   wherein if the window has been selected, the operation key image is moved to a location which is adjacent to the window,
   wherein the operation key image is changed to an image representative of a controllable function of a program corresponding to the selected window, and
   wherein the operation key controls at least one function of the program corresponding to the selected window.

* * * * *